United States Patent
Wink et al.

(10) Patent No.: US 11,552,412 B2
(45) Date of Patent: Jan. 10, 2023

(54) BUILDING BLOCK FOR SPACE-BASED PHASED ARRAY

(71) Applicant: LOCKHEED MARTIN CORPORATION, Bethesda, MD (US)

(72) Inventors: Timothy Patrick Wink, Castle Rock, CO (US); James F. Mulvey, Castle Pines, CO (US); Eric P. Osborne, Littleton, CO (US); Thomas R. Stephenson, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/524,650

(22) Filed: Nov. 11, 2021

(65) Prior Publication Data

US 2022/0069478 A1 Mar. 3, 2022

Related U.S. Application Data

(62) Division of application No. 15/953,368, filed on Apr. 13, 2018, now Pat. No. 11,217,901.

(51) Int. Cl.

| | |
|---|---|
| *H01Q 13/02* | (2006.01) |
| *H01Q 21/06* | (2006.01) |
| *H01Q 15/24* | (2006.01) |
| *H01Q 21/00* | (2006.01) |
| *H01P 1/20* | (2006.01) |
| *H01Q 1/28* | (2006.01) |
| *B64G 1/66* | (2006.01) |

(52) U.S. Cl.
CPC ............. *H01Q 21/064* (2013.01); *H01P 1/20* (2013.01); *H01Q 1/28* (2013.01); *H01Q 13/02* (2013.01); *H01Q 13/0283* (2013.01); *H01Q 15/24* (2013.01); *H01Q 21/0087* (2013.01); *B64G 1/66* (2013.01)

(58) Field of Classification Search
CPC ........ H01Q 21/064; H01Q 1/28; H01Q 13/02; H01Q 13/0283; H01Q 15/24; H01Q 21/0087
See application file for complete search history.

(56) References Cited

U.S. PATENT DOCUMENTS

| | | | |
|---|---|---|---|
| 3,646,565 | A | 2/1972 | Robinson, Jr. |
| 5,258,768 | A | 11/1993 | Smith |
| 6,201,508 | B1 | 3/2001 | Metzen |
| 6,703,976 | B2 | 3/2004 | Jacomb-Hood |
| 6,950,062 | B1 | 9/2005 | Mather |
| 7,948,443 | B2 | 5/2011 | Bullock |
| 10,109,604 | B2 | 10/2018 | Topak |
| 10,665,931 | B2 | 5/2020 | Lier |
| 2009/0015352 | A1 | 1/2009 | Goebel |

*Primary Examiner* — Graham P Smith
(74) *Attorney, Agent, or Firm* — BakerHostetler

(57) ABSTRACT

An apparatus includes an aperture layer coupled to a polarizer layer. The aperture layer includes an antenna and a filter. A circuit layer is mechanically and thermally coupled to the aperture layer. The antenna includes a square horn antenna made of a polymer material. The filter includes a waveguide filter having a first and a second piece separately molded. The waveguide filter includes a folded-back waveguide coupled to the horn antenna at one end and to the circuit layer at another end.

13 Claims, 12 Drawing Sheets

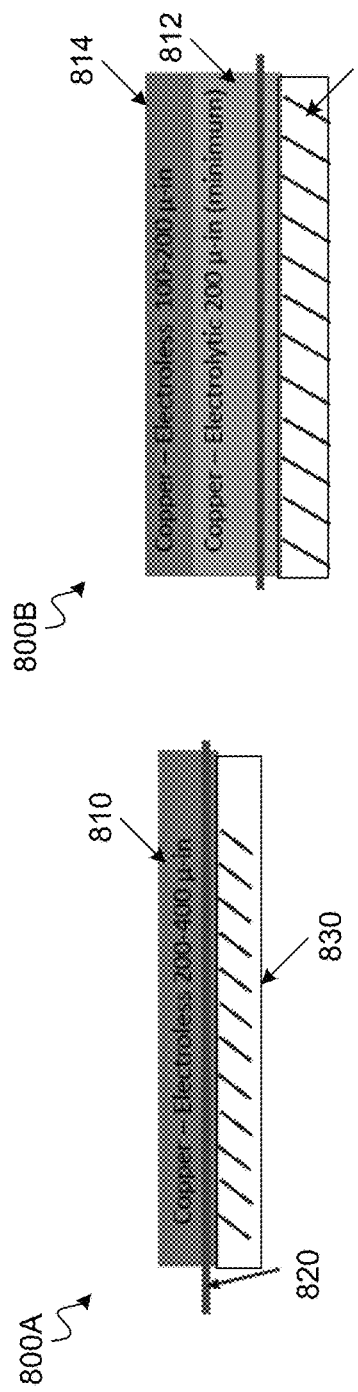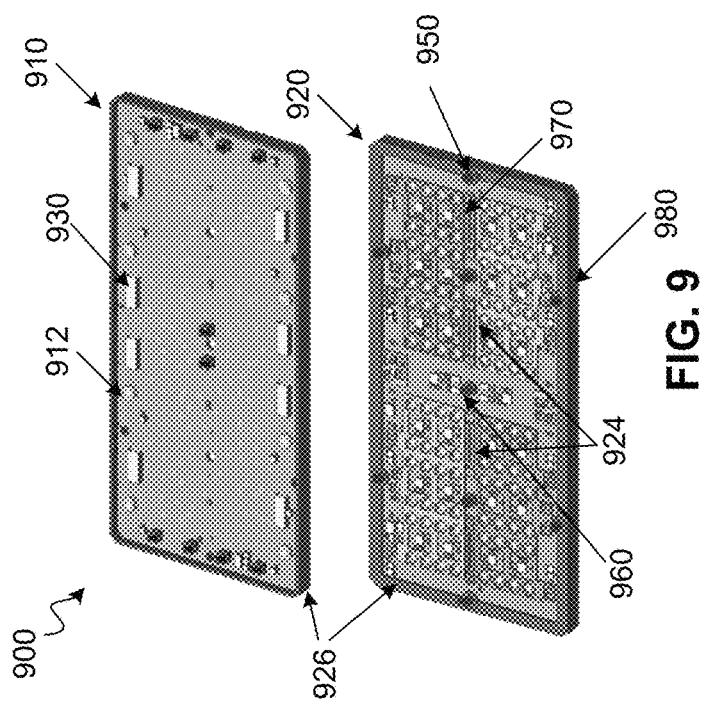

BUILDING BLOCK FOR SPACE-BASED PHASED ARRAY

CROSS-REFERENCE TO RELATED APPLICATION

This application is a divisional of application Ser. No. 15/953,368, filed on Apr. 13, 2018, the entirety of which is incorporated herein by reference for all purposes.

STATEMENT REGARDING FEDERALLY SPONSORED RESEARCH OR DEVELOPMENT

Not applicable

FIELD OF THE INVENTION

The present invention generally relates to antennas, and more particularly, to a building block for space-based phased array.

BACKGROUND

Many space-based radar systems use phased-array antennas to detect, identify and track targets near the Earth's surface. These phased-array antennas can be large monolithic antennas having large receiving aperture designed to achieve high gains. Moving target detection requires a high signal-to-noise ratio, which can be achieved by using complex phased-array antennas fed by powerful transmitters. Supporting frames used to hold large numbers of antenna array elements in a well-defined, fixed spatial orientation can be substantially large, which can add to the mass and complexity of such systems and results in larger overall mass of the space-based radar systems employing phased-array antennas. Therefore, compact, low cost and light-weight modular phased array structures are desired.

SUMMARY

According to various aspects of the subject technology, methods and configuration are disclosed for providing an array module for a multi-beam phased array antenna for spacecraft. The array module of the subject technology is a compact, low-cost, reliable, efficient and light-weight array module. The disclosed array module can be assembled into a desired size array in a highly automated manufacturing process. The application of the disclosed array module in a spacecraft can contribute to achieving a lower-mass, lower-cost and better producibility of the spacecraft. In addition, the disclosed array module allows a scalable design for various antenna element aperture sizes, spacing, and phased array geometries.

In one or more aspects, an apparatus includes an aperture layer coupled to a polarizer layer. The aperture layer includes an antenna and a filter. A circuit layer is mechanically and thermally coupled to the aperture layer. The antenna includes a square horn antenna made of a polymer material. The filter includes a waveguide filter having a first and a second piece separately molded. The waveguide filter includes a folded-back waveguide coupled to the horn antenna at one end and to the circuit layer at another end.

In other aspects, a phase array includes multiple subarrays. Each subarray includes a number of array modules. Each array module includes an aperture layer having a horn antenna and a waveguide filter. A circuit layer is coupled to the aperture layer. Each of the subarrays and array modules is thermally and spatially isolated with a clearance gap to reduce thermal distortion effects. The waveguide filter includes a first and a second piece separately molded. The waveguide filter is a folded-back waveguide coupled to the horn antenna at one end and to the circuit layer at another.

In yet other aspects, a method of providing a array module for a phased array includes forming a horn antenna using a polymer material. The method further includes forming a waveguide filter including separately molding a first piece and a second piece. The horn antenna is coupled to the waveguide filter to form an aperture layer. The aperture layer is coupled to a circuit layer. The horn antenna is a square horn, and the waveguide filter is a folded-back waveguide coupled to the horn antenna at one end and to the circuit layer at another end.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 8A-8B are schematic diagrams illustrating example plating structures for array modules of the antenna subarray of FIG. 1, according to certain aspects of the disclosure.

FIG. 9 is a schematic diagram illustrating exploded views of example structures of top and bottom surfaces of a printed wired board (PWB) of the antenna subarray of FIG. 1, according to certain aspects of the disclosure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

According to some aspects of the subject technology, methods and configuration are disclosed for providing an array module for a space-based phased array. The disclosed array module is a compact, low-cost, reliable, efficient and light-weight array module. The array module of the subject technology can be assembled into a desired size array in a highly automated manufacturing process. The disclosed array module can be employed in a spacecraft and can contribute to achieving a lower-mass and a lower-cost and better producibility of the spacecraft. The application of the disclosed array module is not, however, limited to spacecraft and the antenna phased arrays based on the array modules of the subject technology can be employed in terrestrial application as well. Further, the disclosed array modules are not limited to a specific frequency band and can be used in various frequency bands including, for example, Ka band (e.g., about 26.5-40 GHz), Ku band (e.g., about 12-18 GHx), X band (e.g., about 8-12 GHz) and extremely high-frequency (EHF) band (e.g., about 30-300 GHz). Additionally, the disclosed array module allows a scalable design for various antenna element aperture sizes, spacing, and phased array geometries.

Figure 1:
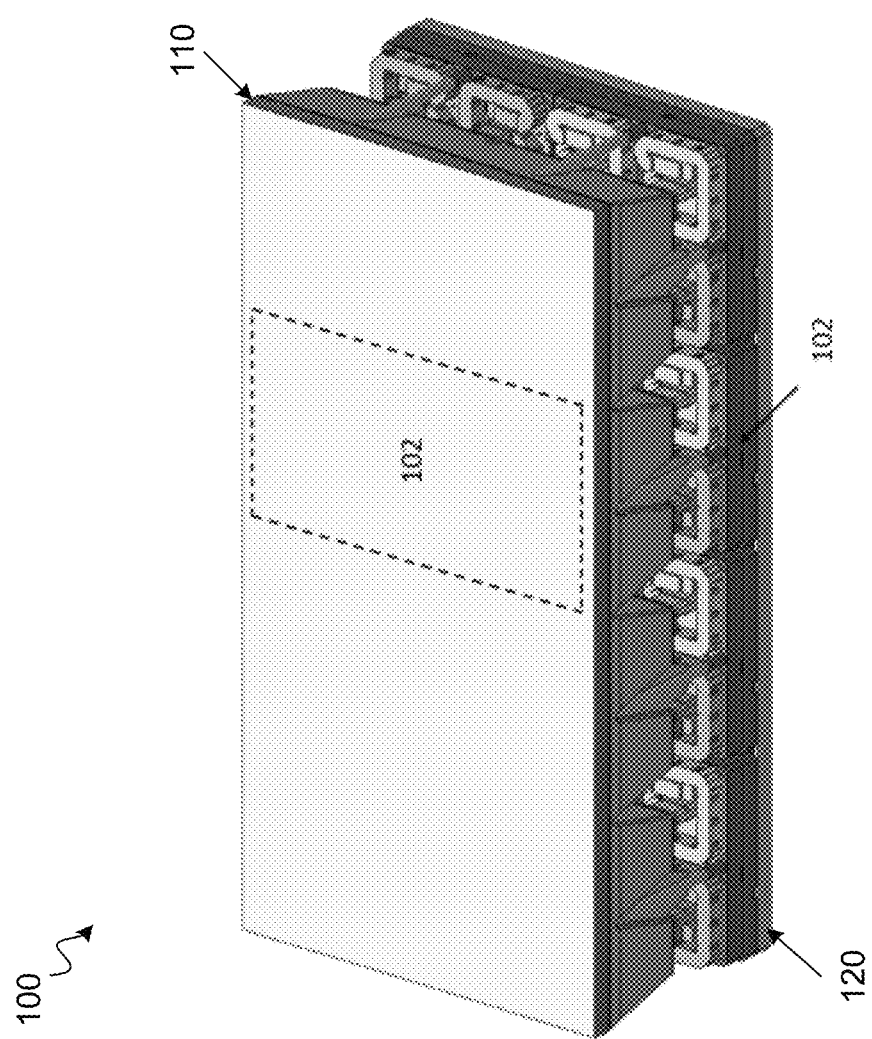
FIG. 1 is a high-level diagram illustrating an example structure of an antenna subarray, according to certain aspects of the disclosure.

FIG. 1 is a high-level diagram illustrating an example structure of an antenna subarray 100, according to certain aspects of the disclosure. The mechanical assembly for a space-based phased array may allow for a small array module to be used to produce large scale phased array systems. The phased array module may, for example, be based on a 31 and 62 mm antenna spacing, although the antenna spacing can be variable. The example antenna subarray (also referred to as a "tile") 100 includes a number of (e.g., 4, 8, 16 or more) array modules 102. Components of the array modules 102 (also referred to as "building blocks") of the antenna subarray 100 are sandwiched between a polarizer layer 110 and a mounting frame layer 120, as will be discussed in more detail herein.

In some implementations, the antenna subarray 100 can be a compact module built with dimensions of approximately 500 mm×500 mm×180 mm and can have a relatively low mass of about 15 Kg. In one or more implementations, the mounting frame layer 120 of the antenna subarray 100 can be installed on a spacecraft with spacecraft structure surrounding a phased array antenna formed of a number of antenna subarray 100. In some implementations, the polarizer layer 110 can be a multi-layer structure made, for example, of 4 layer of Mylar films and a foam material (e.g., HF31).

Figure 2:
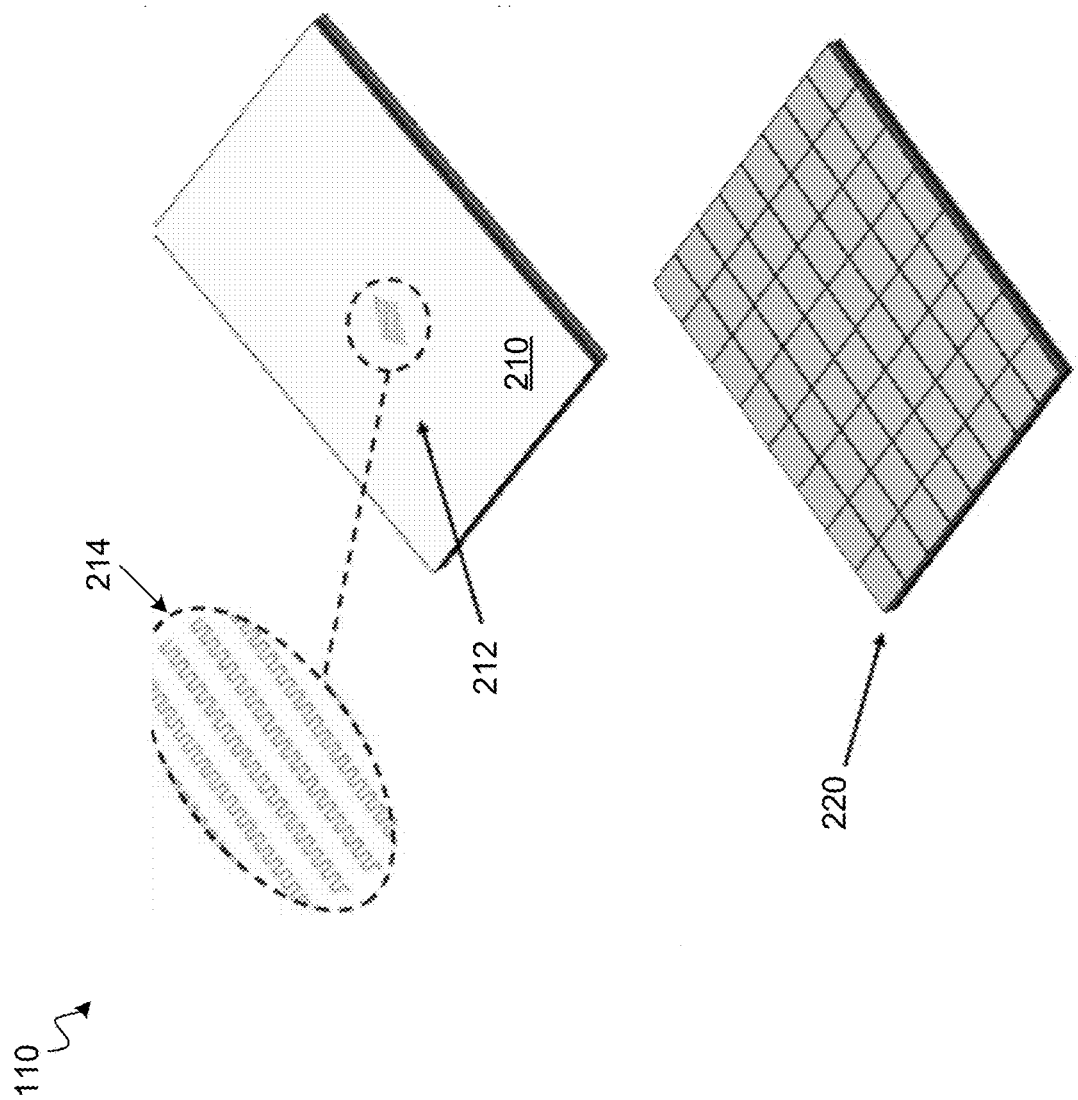
FIG. 2 is a schematic diagram illustrating an example structure of a polarizer of the antenna subarray of FIG. 1, according to certain aspects of the disclosure.

FIG. 2 is a schematic diagram illustrating an example structure of a polarizer 110 of the antenna subarray 100 of FIG. 1, according to certain aspects of the disclosure. The polarizer 110 is used to convert the linear polarization of the antenna subarray 100 of FIG. 1 to a circular polarization. The polarizer 110 can be multi-layer structure with an approximate thickness of about 17 mm including an outer face layer 210 and an inner face layer 220. In one or more implementations, the outer face layer 210 includes a surface layer meander 212, the structural detail of which is shown in the exploded view 214. The surface layer meanders 212 are used to bleed charge from a front face of the antenna. The foam spacer (e.g., HF31 foam) can be a quarter-wavelength spacer. The polarizer 110 may be covered by sun blocking ray dome.

Figure 3:
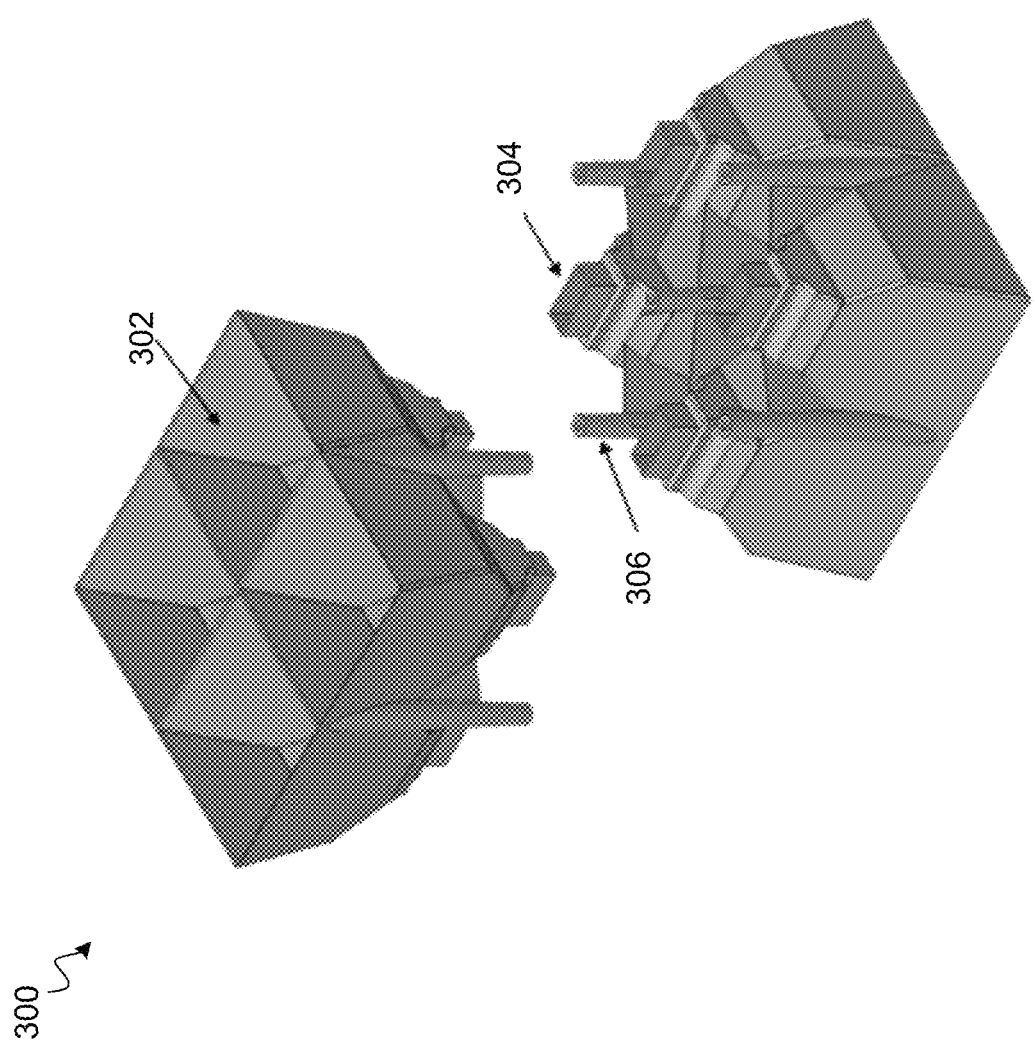
FIG. 3 is a schematic diagram illustrating an example structure of a horn antenna of the antenna subarray of FIG. 1, according to certain aspects of the disclosure.

FIG. 3 is a schematic diagram illustrating an example structure of a horn antenna 300 of the array module 102 of FIG. 1, according to certain aspects of the disclosure. In some implementations, the example horn antenna 300 includes four feeds on an approximately 62 mm pitch, but is not limited to four feeds and can include a higher number of feeds. In one or more implementations, the aperture 302 of the horn antenna 300 is a square with a side dimension within a range of about 50-70 mm, and the wall thickness of the horn antenna 300 is about 0.5 mm. In one or more implementations, the horn antenna 300 is made by using injection molding of a glass filled resin (e.g., Ultem). An interface 304 couples the horn antenna 300 to a waveguide filter (not shown for simplicity). Mounting bosses 306 with threaded inserts are used to mount the waveguide filter to the horn antenna 300. The horn antenna 300 and the waveguide filter (discussed below) form an aperture layer that also serve as a protective and shielding enclosure for the electronic assemblies coupled to the aperture layer. Elements of the aperture layer can be designed around low cost, high volume manufacturing processes without the high cost typically associated with satellite components or the high mass associated with machined metal components. The aperture layer is combined to a circuit layer discussed below. The disclosed approach allows for varying aperture spacing and improved manufacturability.

Figure 4:
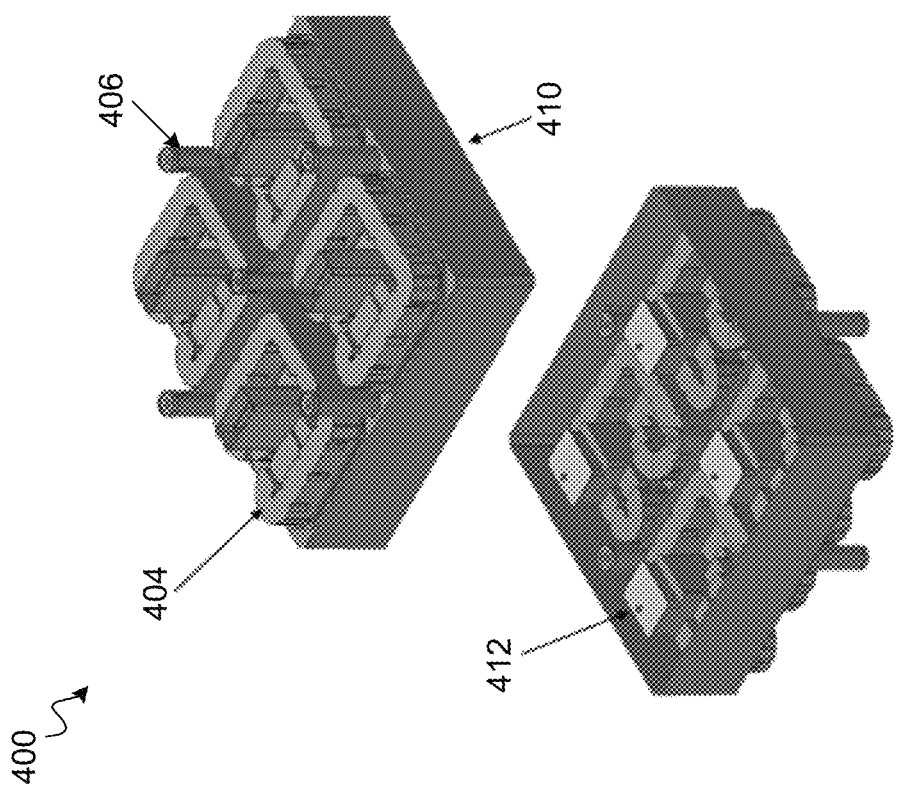
FIG. 4 is a schematic diagram illustrating various views of the example structure of a waveguide filter of the antenna subarray of FIG. 1, according to certain aspects of the disclosure.

FIG. 4 is a schematic diagram illustrating various views of the example structure of a waveguide filter 400 of the array module 102 of FIG. 1, according to certain aspects of the disclosure. The waveguide filter 400 includes an upper half 404 and a lower half 410 that can be separately molded. The waveguide filter 400 has a folded-back waveguide structure that at one end is coupled to the interface 304 of FIG. 3 and at the other end is coupled via a probe launch cover 412 to a circuit layer. Also shown in the waveguide filter 400, there are mounting buses 406 that can be coupled to mounting buses 306 of FIG. 3.

Figure 5:
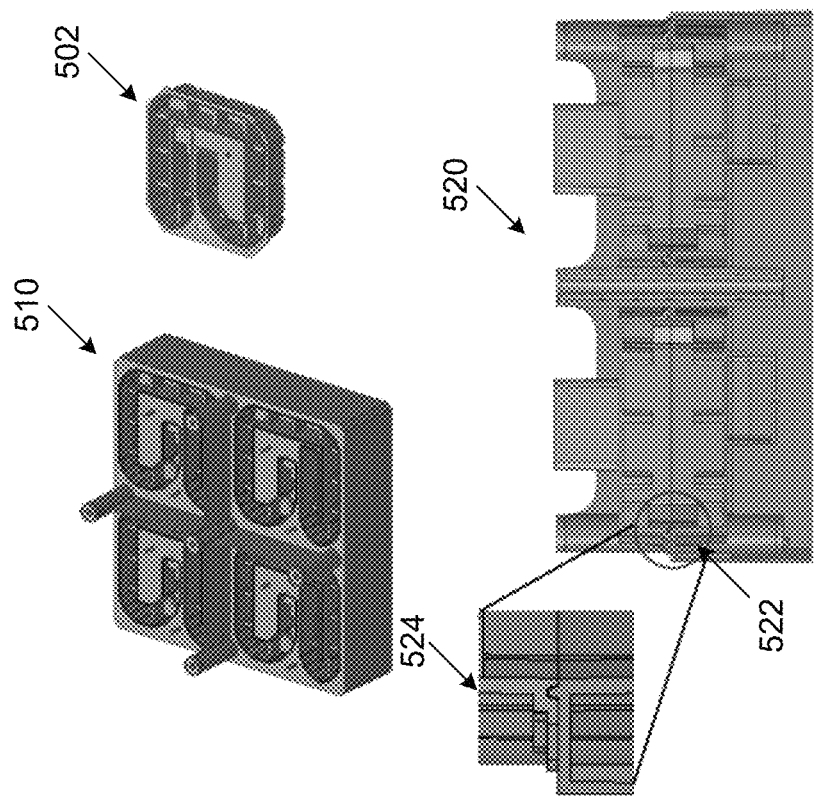
FIG. 5 is a schematic diagram illustrating various views of the example structure of the waveguide filter of FIG. 4, according to certain aspects of the disclosure.

FIG. 5 is a schematic diagram illustrating various views of the example structure of the waveguide filter 400 of FIG. 4, according to certain aspects of the disclosure. The perspective view 510 of FIG. 5 depicts the structure of the lower half 410 of the waveguide filter 400, which match the structure of the upper half 404 of FIG. 4. The upper half 404 of the waveguide filter 400 can be made of two pieces, one of which is the lower piece 502 that can be molded separately from a matching upper piece. The upper and lower pieces can be bonded together using, for example, a silver filed epoxy. Alignment features such as shown in an exploded view 524 of a section 522 of the cross sectional view 520 allow for aligning the parts before and after bonding.

Figure 6B:
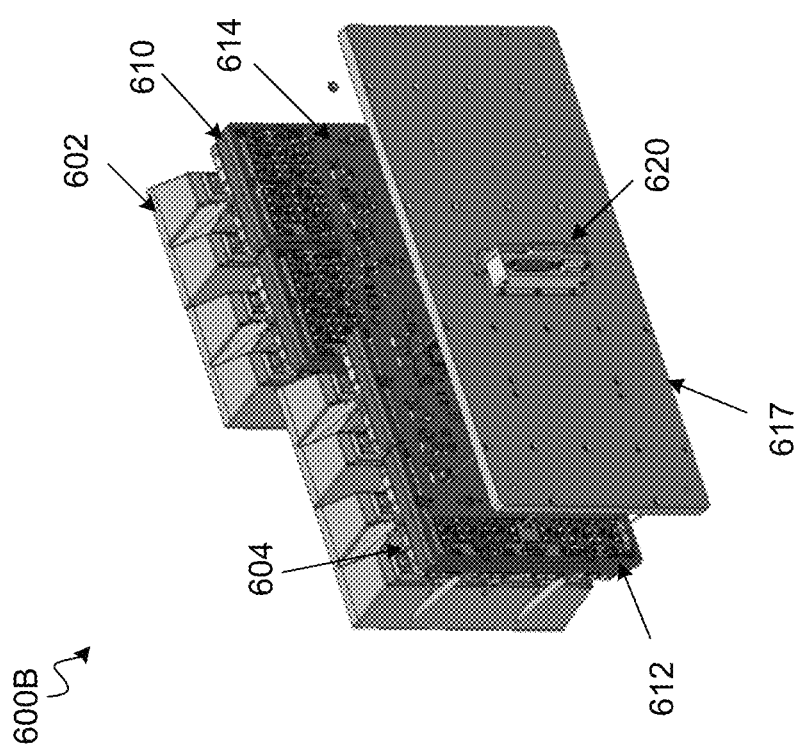
FIGS. 6A-6B are schematic diagrams illustrating exploded views of various components of the example antenna subarray of FIG. 1, according to certain aspects of the disclosure.
Figure 6A:
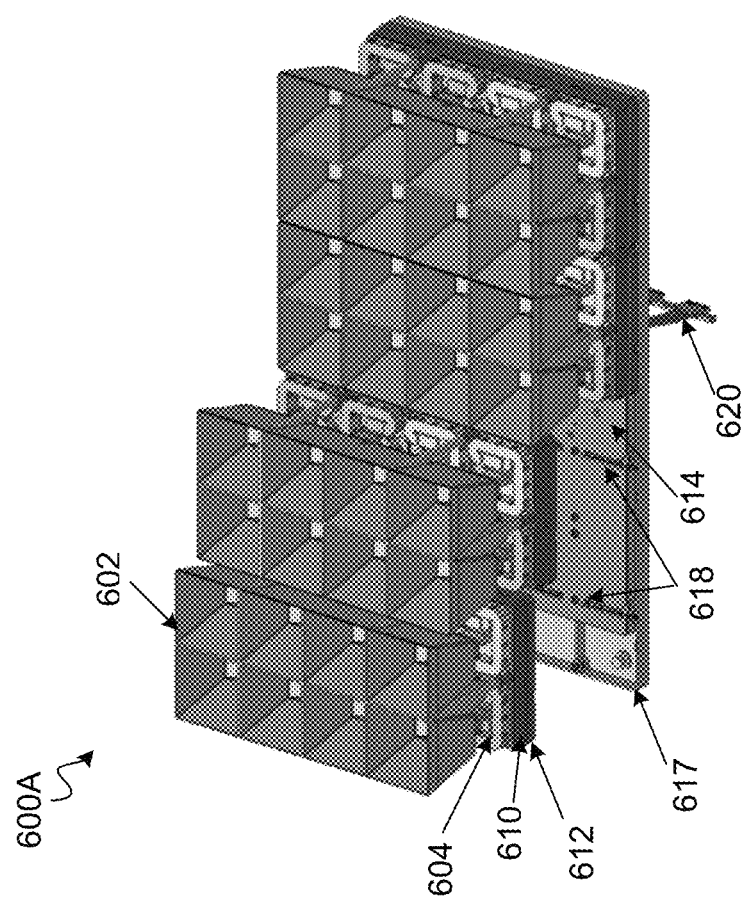

FIGS. 6A-6B are schematic diagrams illustrating exploded views 600A and 600B of various components of the example subarray 100 of FIG. 1, according to certain aspects of the disclosure. The exploded view 600A shows the square horn antennas 602, waveguide filters including an upper half 604 and a lower half 610, a circuit layer including a printed wired board (PWB) 612, a distribution layer 614 including interposers 618 (e.g., RF and DC interposers), a mounting frame 617 and an input/output (I/O) connectors 620. The square horn antenna 602 is 4×4 structure including 16 horn antenna elements (e.g., each associated with a array module), but is not limited to 16 and can be made of less or more number of horn antenna elements. The upper half waveguide filters are folded-back waveguides as described above which are placed in the lower half 610 that couples the square horn antenna 602 to the mounting frame 617 of the circuit layer. The distribution layer 614 couples the I/O connectors 620 to the mounting frame 617. The interposers 618 electrically couple circuit layers of different array modules. Further, connections between the array modules and the backplane are achieved using the same interposers connecting the circuit layer. Each array module of the subject technology is thermally and spatially isolated with a clearance gap to adjacent array modules to minimize thermal distortion effects between array modules. This allows preventing degrading of a satellite performance due to thermal distortion between array modules in the antenna array.

The exploded view 600B shows another view of the structure shown in FIG. 6A and includes the square horn antenna 602, the waveguide filters including the upper half 604 and a lower half 610, the circuit layer including the PWB 612, the distribution layer 614 the mounting frame 617 and the I/O connectors 620. The RF, optical, power, control and other signals are provided to the distribution layer via I/O connectors 620 and satellite harness connections. The tiles (e.g., antenna subarrays 100 of FIG. 1) are combined to form a scalable phased array system. Individual tiles can be added or removed without impacting adjacent tiles. This reduces satellite assembly cost, time and effort. The mechanical assembly for a space-based phased array allows for a small array module to be used to produce large scale phased array systems.

Figure 7B:
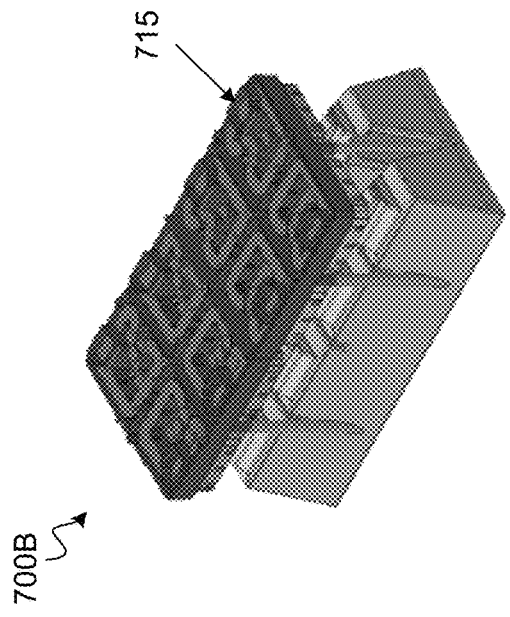
FIGS. 7A through 7C are schematic diagrams illustrating exploded views of various components of the array modules of FIG. 1, according to certain aspects of the disclosure.
Figure 7C:
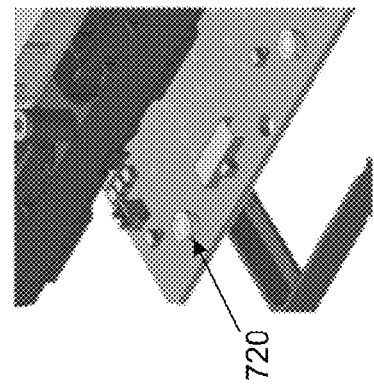
Figure 7A:
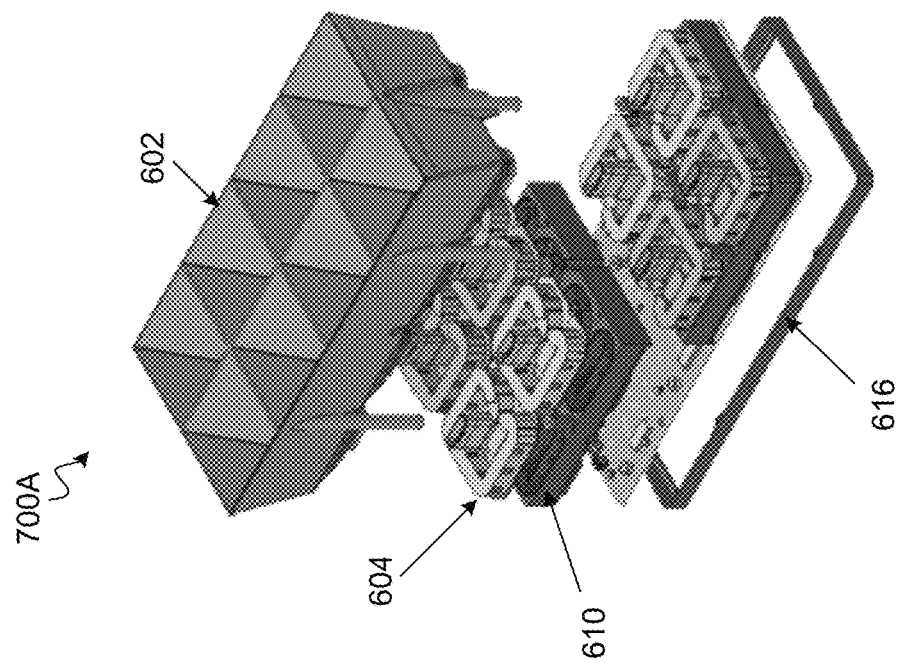

FIGS. 7A through 7C are schematic diagrams illustrating exploded views 700A, 700B and 700C of various components of the array module 102 of FIG. 1, according to certain aspects of the disclosure. The exploded views 700A of FIG. 7A depicts the square horn antenna 602, waveguide filter upper and lower half portions 604 and 610 and the module frame 616. The exploded views 700B of FIG. 7B shows among other components an example filter to PWB interface 715 (from the filter side), and the exploded view 700C of FIG. 7C is used to depict the example filter to PWB interface 715 from the PWB side.

FIGS. 8A-8B are schematic diagrams illustrating example plating structures 800A and 800B for array modules of the antenna subarray 100 of FIG. 1, according to certain aspects of the disclosure. The plating structure 800A of FIG. 8A includes an electrode layer (e.g., copper) 810 with an example thickness within a range of about 5-10 μm (200-400 μ-in) and an oxidation resist layer 830 made, for example, of Ebanol C or Benzotriazole (BTA) material. The layer 820 represents an approximate skin depth at Ku transmit (TX) frequency. The plating structure 800B of FIG. 8B includes a lower electrode layer (e.g., copper) 812 with an example thickness of about 5 μm (200 μ-in), an upper electrode layer (e.g., copper) 814 with an example thickness within a range of about 2.5-5 μm (100-200 μ-in) and the oxidation resist layer 830.

FIG. 9 is a schematic diagram illustrating exploded views of example structures of top and bottom surfaces 910 and 920 of a printed wired board (PWB) of the antenna subarray 100 of FIG. 1, according to certain aspects of the disclosure. The exploded view 900 shows top and bottom 910 and 920 of an MLB antenna integrated module. The top surface 910 includes, for example, RF launch probes 912 (e.g., 4 probes) thermal bonds 930. The bottom surface 920 includes, for example, pads 924 for distribution board interposers, RF and DC interposers 970 and a center boss 960. Mounting frames 260 embrace the PWB and includes mounting frame bosses (e.g., four bosses) 950 and a thermal interface area 980. The PWBs can have multiple (e.g., 17) layers including monolithic microwave integrated circuits (MMICs) interconnected with wire bond and ribbon bonds.

The mounting frame 926 can be designed to zero out tolerance accumulations stemming from the variations in PWBs thicknesses by employing adjustable bushings that lie outside a predetermined tolerance range. This allows interconnections between circuit card members using pad contacts and interposers. In a conventional design, this is achieved using pin and socket connecters and radio-frequency (RF) cables or RF blind mate connectors (BMCs). The disclosed approach lowers the card spacing, assembly mass, cost and eliminates the chance of damage to contact pins common in blind mate electrical assemblies. The mounting frame 926 further provides thermal and structural load paths from the array modules to the structure of a host spacecraft (e.g., a satellite). The aperture/circuit array modules are connected into a larger tile layer using a backplane consisting of RF, optical, digital and DC elements.

The array module PWB is enclosed in the mounting frame 926 using features that zero out tolerance accumulations stemming from the variations in the PWB thickness. All array modules are fastened to the mounting frame 926 using a minimal number of fasteners which pass thru all layers to form the structural load path. Conventional electronic assemblies employ a large quantity of screws to provide attenuation to radiated and conducted emissions. The layered approach of the subject technology does not require the use of large quantities of fasteners. Additionally, automated manufacturing techniques can be used to build the phased array assembly of the subject technology to eliminate touch labor thereby improving manufacturing throughput and lowering manufacturing defects.

Figure 10:
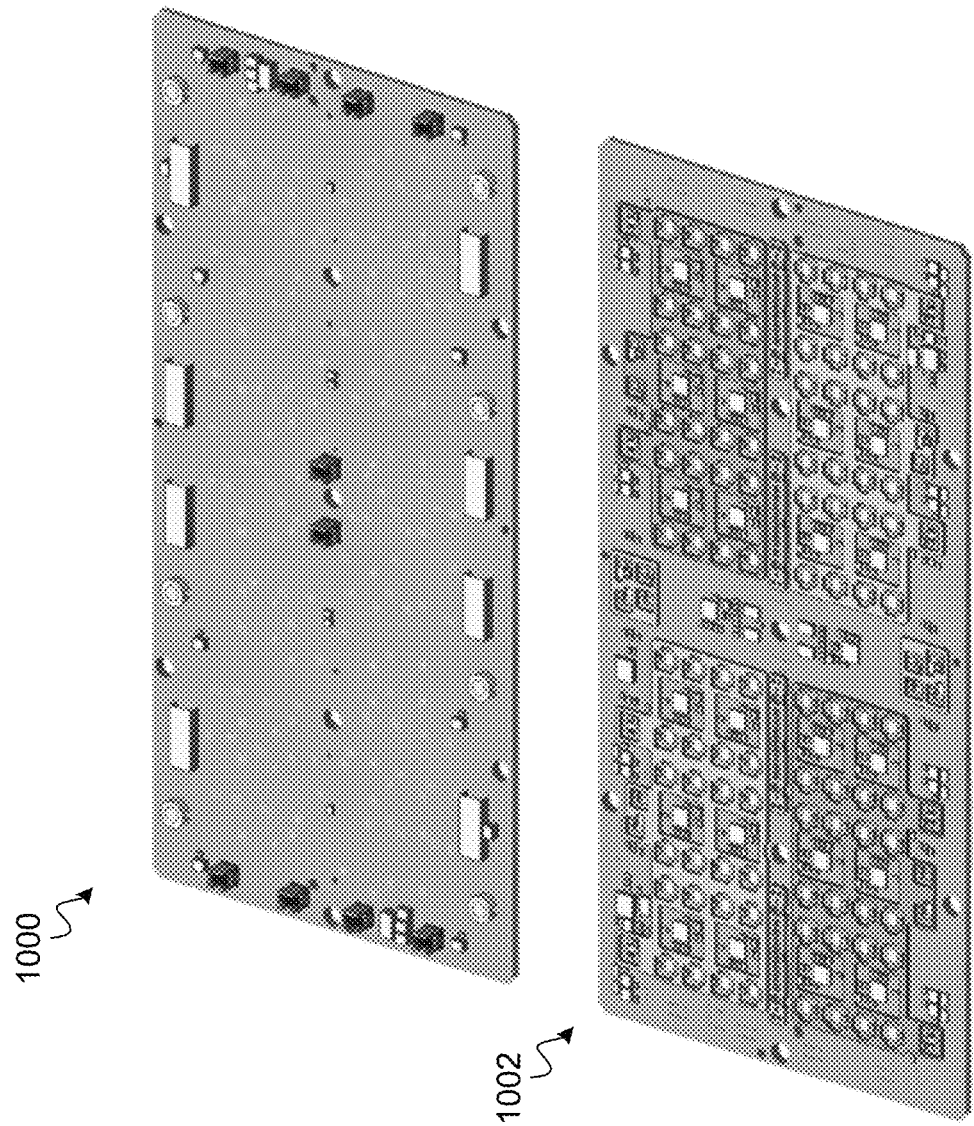
FIG. 10 is a schematic diagram illustrating top and bottom views of an example of an array module PWB of the subarray of FIG. 1, according to certain aspects of the disclosure.

FIG. 10 is a schematic diagram illustrating top and bottom views 1000 and 1002 of an example of an array module PWB of the array module 102 of FIG. 1, according to certain aspects of the disclosure. The top view 1000 faces the filter assembly and the bottom view 1002 faces the distribution PWB. In some implementations, the single board design shown in FIG. 10 can include more than one board.

Figure 11:
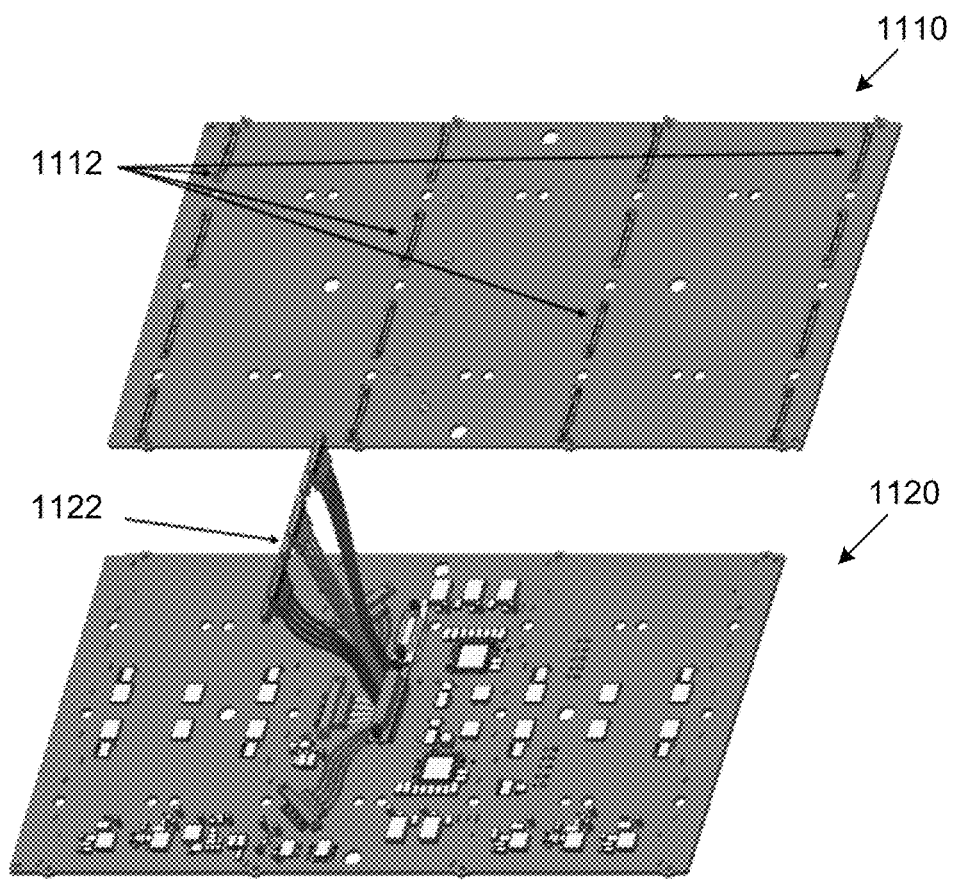
FIG. 11 is a schematic diagram illustrating top and bottom views of an example distribution board of the antenna subarray of FIG. 1, according to certain aspects of the disclosure.

FIG. 11 is a schematic diagram illustrating top and bottom views 1110 and 1120 of an example distribution board 1100 of the antenna subarray 100 of FIG. 1, according to certain aspects of the disclosure. The top view 1110 of the example distribution board 1100 depicts a number of (e.g., 16) interposers 1112. The bottom view 1120 of the example distribution board 1100 depicts a space wire interface 1122, but can also include a power controller interface, RF cables with interposer contacts and an subarray DC interface.

Figure 12:
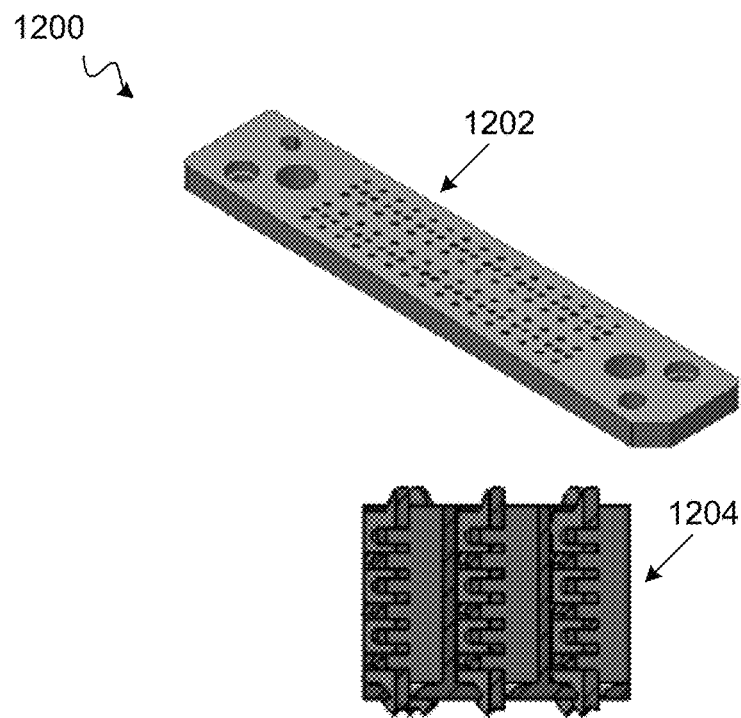
FIG. 12 is a schematic diagram illustrating example connectors of the distribution board of FIG. 11.

FIG. 12 is a schematic diagram illustrating example connectors 1200 of the distribution board 1100 of FIG. 11. The example connectors 1200 shown in FIG. 12 include a 16 channel RF interposer 1202 and a ladder contact 1204 of Ardent Concepts, of which a cross-sectional view is shown.

Figure 13:
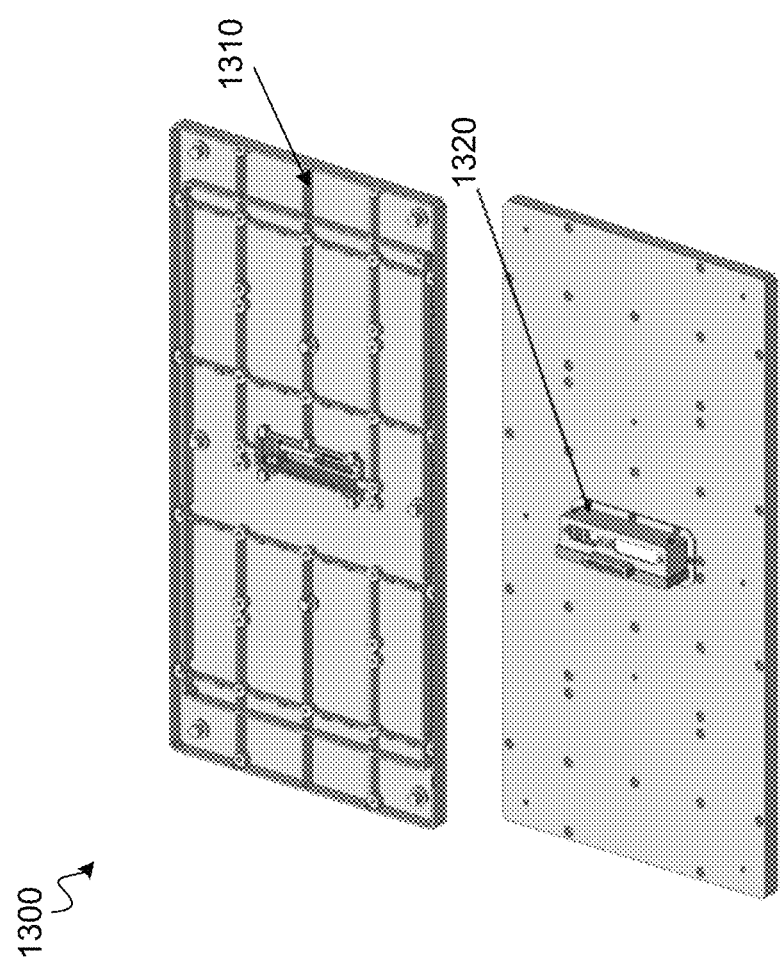
FIG. 13 is a schematic diagram illustrating an example structure of a mounting frame the distribution board of FIG. 12, according to certain aspects of the disclosure.

FIG. 13 is a schematic diagram illustrating an example structure of a mounting frame 1300 of the distribution board 1100 of FIG. 12, according to certain aspects of the disclosure. The mounting frame 1300 can be made of aluminum and finished with a protection layer. The mounting frame 1300 includes internal support ribs 1310 for distribution board interposers and an EMI close out structure 1320 for preventing EMI leakage out of the subarray.

Figure 14:
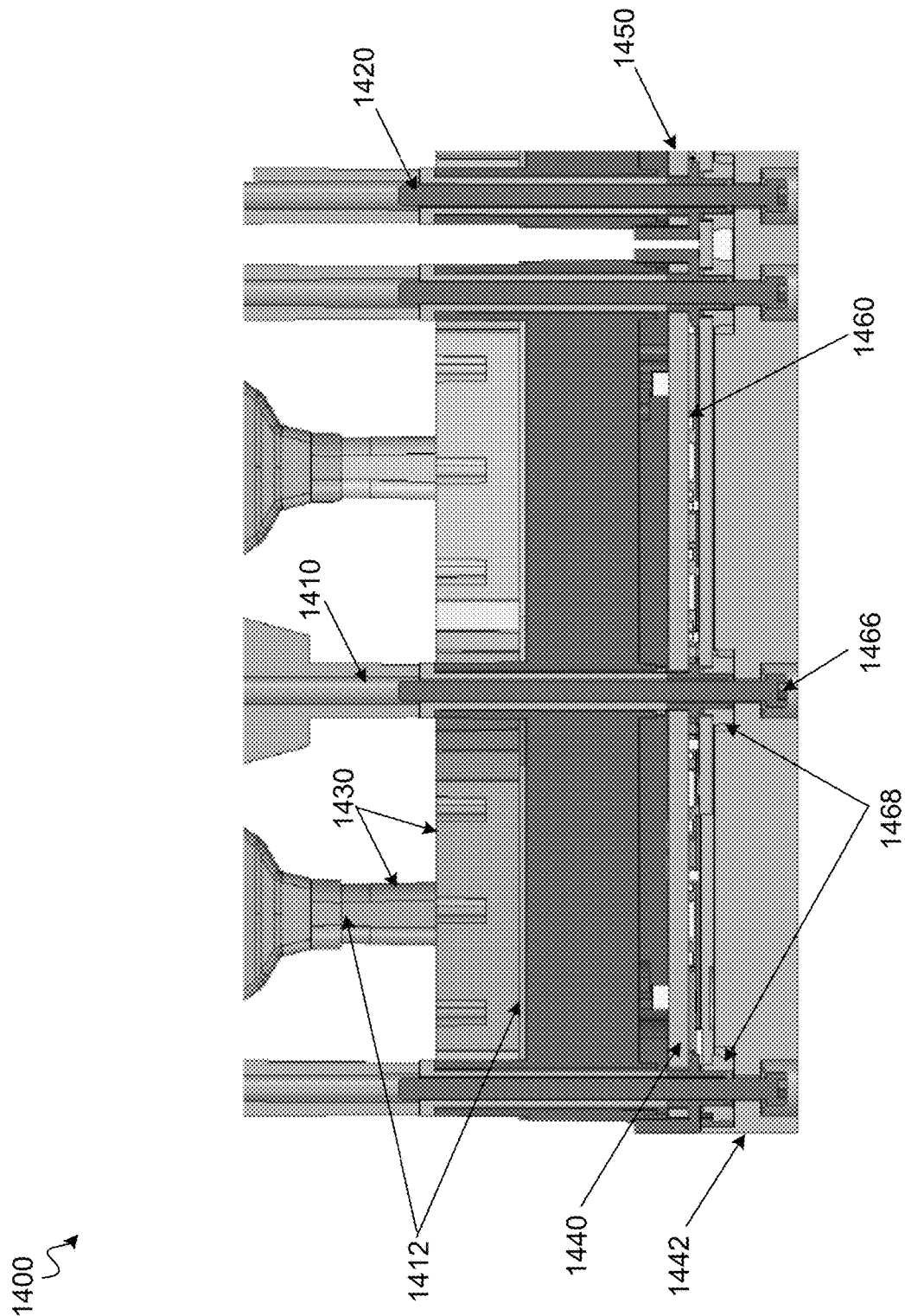
FIG. 14 is a schematic diagram illustrating an example cross-sectional view of the structure of the antenna subarray of FIG. 1, according to certain aspects of the disclosure.

FIG. 14 is a schematic diagram illustrating a cross-sectional view 1400 of the structure of the subarray 100 of FIG. 1, according to certain aspects of the disclosure. The cross-sectional view 1500 shows thermal and structural load paths including horn bosses 1510, silver epoxy bonds 1512, aluminum inserts 1520, a filter assembly 1530, a tile frame 1540, an subarray mounting frame 1542, an upper PWB 1550, a distribution PWB 1460, bushings 1462, thru fasteners with washer 1466 and thermal bonds 1468. The silver epoxy bonds 1412 bond the molded parts of the waveguide filter (e.g., 604 and 610 of FIG. 6A). The thermal bonds 1468 are established between the distribution board (e.g., 618 of FIG. 6A) and the tile frame (e.g., 616 of FIG. 6A) and also between the lower PWB 1452 and the module frame.

Figure 15:
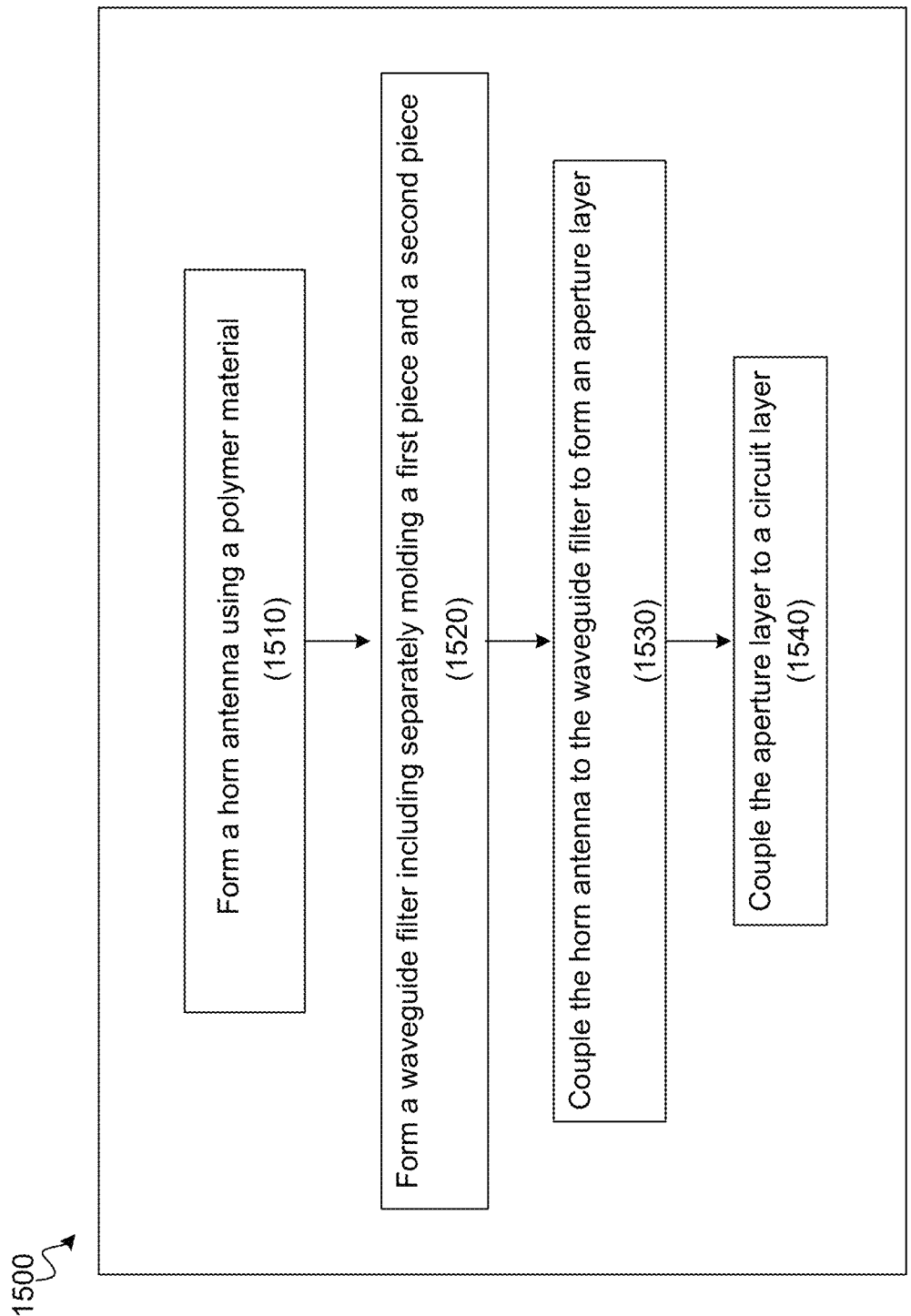
FIG. 15 is a flow diagram illustrating an example method of providing an antenna subarray, according to some aspects of the subject technology.

FIG. 15 is a flow diagram illustrating an example method 1500 of providing an antenna subarray (e.g., 100 of FIG. 1), according to some aspects of the subject technology. The method 1500 includes forming a horn antenna (e.g., 300 of FIG. 3), using a polymer material (16510). The method 1500 further includes forming a waveguide filter (e.g., 400 of FIG. 4) including separately molding a first piece (e.g., 404 of FIG. 4) and a second piece (e.g., 410 of FIG. 2) (1520). The horn antenna is coupled to the waveguide filter to form an aperture layer (e.g., 602, 604 and 610 of FIG. 6A) (15630). The aperture layer is coupled to a circuit layer (e.g., 612 and 614 of FIG. 6A) (1540). The horn antenna is a square horn, and forming the waveguide filter is performed by forming a folded-back waveguide (e.g., 404 of FIG. 6A) for coupling to the horn antenna at one end (e.g., via the interface 304 of FIG. 3) and to the circuit layer at another end (e.g., via the probe launch cover 412 of FIG. 4).

As described above, the assembly of the phased array of the subject technology is constructed in layers beginning with a polarizer/ray dome layer, followed by an aperture layer then a circuit layer and finally a subarray distribution layer. The aperture includes an antenna and one or more filter elements. This also serves as a protective and shielding enclosure for the electronic assemblies. Load paths are integral to the aperture layer. Aperture elements are designed around low cost, high volume manufacturing processes which are not typically associated with satellite components. The aperture layer is connected to the circuit layer. This approach allows for varying aperture spacing and improved manufacturability.

The circuit layer is comprised of one or more circuit cards that can be mounted with or without a frame. Interconnections between circuit card members use circuit contacts and interposers which can carry RF, DC and control signals together. In a typically design, this is achieved using separate pin and socket connecters for DC and control and RF cables or RF blind mate connectors for RF signals. This approach decreases the card spacing, assembly mass, cost and eliminates the chance of damage to contact pins common in blind mate electrical assemblies. The circuit layer also provides thermal and structural load paths from the array modules to the satellite structure. The circuits can be tested independent of the other members of the array module thus reducing the potential for discovering defects later in the assembly process. The aperture and circuit array modules are connected into a subarray distribution layer. The subarray distribution layer includes RF, optical, digital and power elements as well as the spacecraft mounting. Electrical connections between the array modules and the tile and distribution layer are also achieved using interposers.

Each array module is thermally and spatially isolated from adjacent array modules to minimize thermal effects between array modules. In a conventional satellite, thermal distortion between elements in an array degrades performance. All array modules are fastened to the spacecraft using a minimal number of mechanical connections which pass thru all layers to form a continuous load path. Conventional satellite and RF electronic assemblies employ a large quantity of screws or other fasteners. The layered approach does not require the use of large quantities of fasteners and allows for adhesive fastening of the component layers. Additionally, automated manufacturing techniques can be used to build the assembly eliminating touch labor to improve manufacturing throughput and lower defects; Array modules are combined to form a scalable phased array system. Individual blocks can be added or removed without impacting adjacent members. This reduces satellite assembly cost, time and effort.

The array module is a better solution because: (1) The higher unit volumes allow for lower cost and automated manufacturing, which is not used in a conventional hand assembled satellite; (2) Interconnections are simplified by using board to board interposers; (3) The array module approach provides a means for a compact and lighter weight design; and is scalable and adaptable to various phased array designs.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method of providing an array module for a phased array, the method comprising:
   forming a horn antenna using a polymer material;
   forming a waveguide filter including separately molding a first piece and a second piece;
   coupling the horn antenna to the waveguide filter to form an aperture layer; and
   coupling the aperture layer to a circuit layer,
   wherein:
   the horn antenna comprises a square horn, and
   forming the waveguide filter comprises forming a folded-back waveguide for coupling to the horn antenna at one end and to the circuit layer at another end.

2. The method of claim 1, further comprising forming a polarizer layer by stacking a plurality of films and separating the films using foam spacers.

3. The method of claim 1, wherein separately molding the first and the second piece comprise using a glass filled polymer, and wherein the method further comprises bonding the first piece to the second piece using a silver filed epoxy.

4. The method of claim 1, further comprising coating the horn antenna and the waveguide filter using multiple copper layers and an anti-corrosion finish layer.

5. The method of claim 1, wherein forming the horn antenna comprises using a glass-filled resin, and wherein a thin wall thickness of the horn antenna is less than about 0.5 mm, and wherein an aperture of the horn antenna is within a range of about 50-70 mm.

6. The method of claim 1, further comprising coupling the circuit layer to a tile layer using a subarray distribution layer, wherein the subarray distribution layer includes radio-frequency (RF), optical, digital and DC power components.

7. The method of claim 1, further comprising electrically coupling a tile layer to a host system using electrical connectors of the tile layer to communicate signals including RF, optical, power and control signals to and from the host system, wherein the host system includes a space vehicle.

8. A phase array comprising:
   a plurality of subarrays, each of the plurality of subarrays comprising a plurality of array modules, each array module comprising:
   an aperture layer comprising a horn antenna and a waveguide filter; and
   a circuit layer coupled to the aperture layer;
   wherein:
   each of the plurality of subarrays is thermally and spatially isolated with a clearance gap to reduce thermal distortion effects,
   the waveguide filter comprises a first and a second piece separately molded, and
   the waveguide filter comprises a folded-back waveguide coupled to the horn antenna at one end and to the circuit layer at another end.

9. The phase array of claim 8, wherein the horn antenna comprises a square horn antenna made of a polymer material including a glass-filled resin and has a thin wall thickness of less than about 1 mm, and wherein an aperture of the square horn antenna is within a range of about 50-70 mm.

10. The phase array of claim 8, wherein a count of the plurality of array modules is scalable with varying horn aperture spacing, and wherein a design of the plurality of array modules allows application of automated manufacturing techniques.

11. The phase array of claim 8, wherein each of the plurality of array modules is has a multilayer structure with mechanical couplings that pass through the multilayer structure to form a continuous heat load path with reduced number of fasteners.

12. The phase array of claim 8, wherein each of the first and the second piece comprise a molded glass filled polymer and are bonded together using a silver filed epoxy, and wherein the waveguide filter comprises multiple plated copper layers and an anti-corrosion finish layer.

13. The phase array of claim 8, wherein the circuit layer is coupled to a tile layer using a subarray distribution layer, wherein the circuit layer is independently testable, and wherein the phased array further comprises interposers configured to electrically connect circuit layers of the plurality of array modules.

* * * * *